United States Patent [19]
Carriazo

[11] 3,859,904
[45] Jan. 14, 1975

[54] AUTOMATED VARIABLE SELECTION SANDWICH PREPARATION DEVICE

[76] Inventor: Jose B. Carriazo, 2619 N. Whipple Ave., Chicago, Ill. 60647

[22] Filed: Feb. 14, 1973

[21] Appl. No.: 332,283

Related U.S. Application Data
[63] Continuation-in-part of Ser. No. 209,760, Dec. 20, 1971, abandoned.

[52] U.S. Cl. .............. 99/450.4, 99/450.7, 221/251
[51] Int. Cl. ..................... B32b 31/04, B32b 31/18
[58] Field of Search ............ 99/450.1, 450.4, 450.5, 99/450.7; 221/121, 122, 251, 270

[56] References Cited
UNITED STATES PATENTS

| | | | |
|---|---|---|---|
| 2,626,575 | 1/1953 | Whitsel | 99/450.4 |
| 3,179,289 | 4/1965 | Moyer et al. | 221/121 |
| 3,326,413 | 6/1967 | Anderson | 221/251 X |
| 3,364,878 | 1/1968 | Kobori | 99/450.4 |

*Primary Examiner*—Harvey C. Hornsby
*Assistant Examiner*—Alan Cantor
*Attorney, Agent, or Firm*—Dominik, Knechtel, Godula & Demeur

[57] ABSTRACT

There is disclosed an automated variable selection sandwich preparation device which comprises a housing having mounted therein first bread source means providing a plurality of bread chambers for bread type selection, food ingredient source means consisting of a plurality of food ingredient chambers for variable selection of various food ingredients, second bread source means mounted within the housing and interconnected with the first bread source means to provide the second slice of bread to complete the sandwich and to ensure that the same bread type dispensed by the first bread source means is also dispensed by the second bread source means, and conveying means disposed beneath the first bread source means, food ingredient source means and second bread source means to advance the sandwich ingredients in various stages of preparation along a longitudinal path until the same is completed. The device is further provided with means for access into the device in order to afford the user the opportunity to remove the completed sandwich at the terminal end of the sandwich preparation cycle.

9 Claims, 14 Drawing Figures

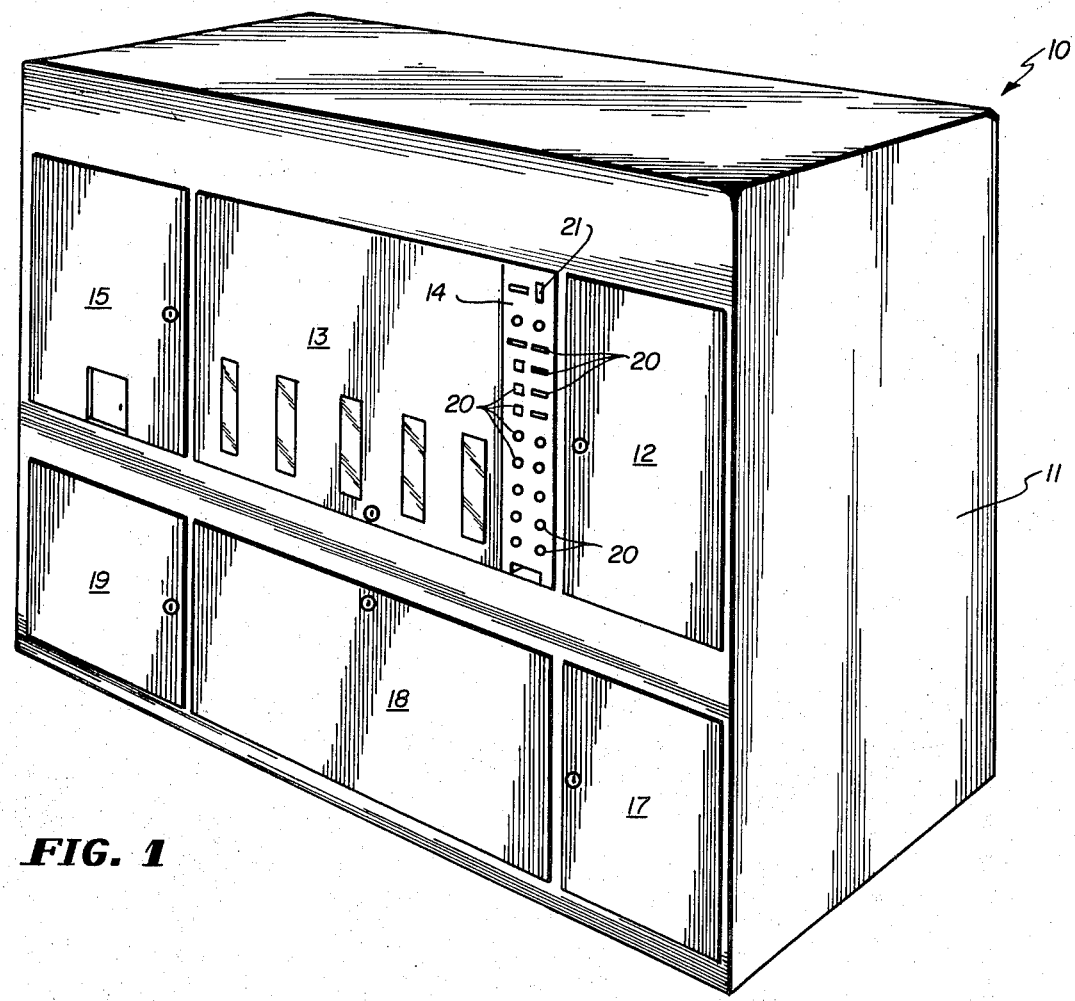
FIG. 1
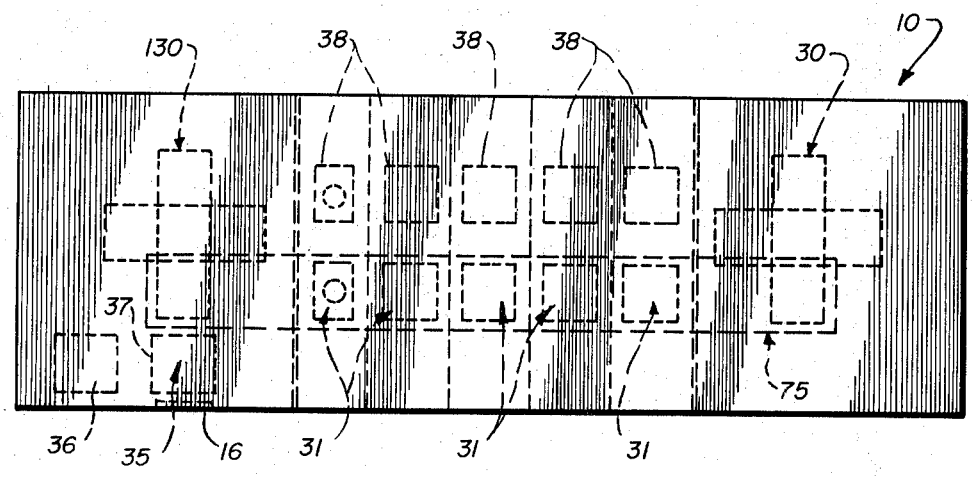

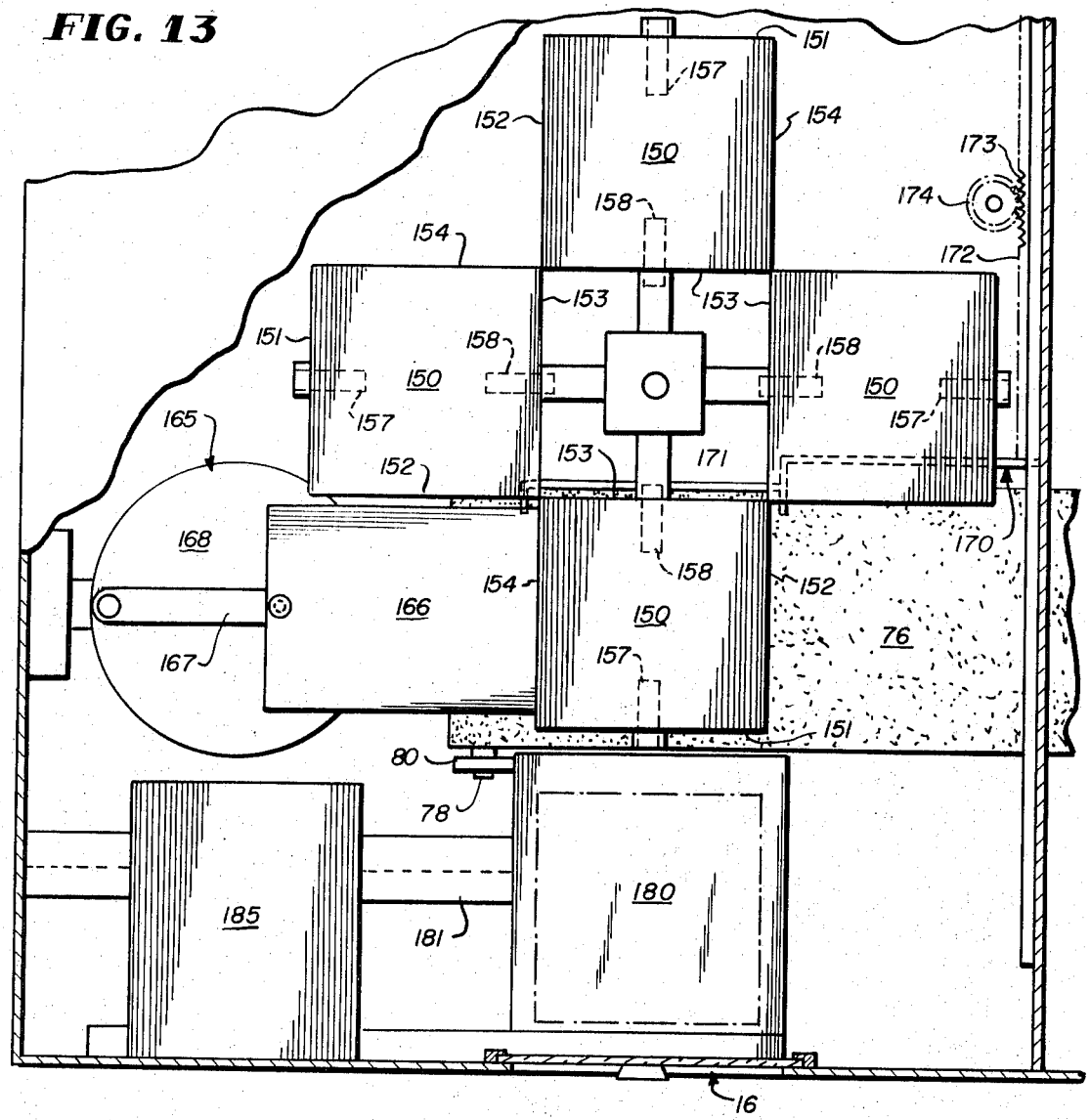
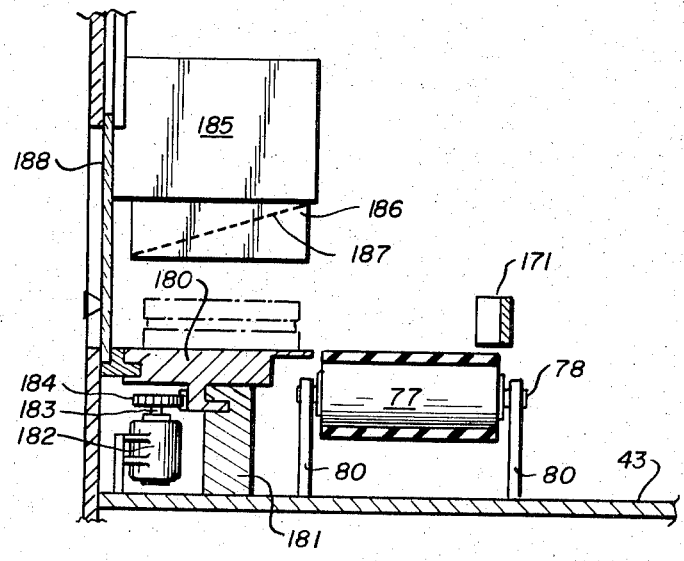

AUTOMATED VARIABLE SELECTION SANDWICH PREPARATION DEVICE

RELATED APPLICATIONS

This is a continuation-in-part of application Ser. No. 209,760, filed on Dec. 20, 1971 in the name of Jose B. Carriazo and entitled AUTOMATIC ELECTRIC SANDWICH MAKING MACHINE, and which is now abandoned.

BACKGROUND OF THE INVENTION

It is well-known that various types of automated machinery now exists in order to vend various types of beverages as well as food products, thereby minimizing manual labor associated with the marketing of food products. For example, the typical beverage dispensers include coffee brewing machines as well as soft drink dispensing machines which are operated in response to the insertion of properly sized coins therein, and will function to dispense the selected beverage. Similarly, food dispensing machines are also known which dispense such food products as candy bars, sandwiches, sweet rolls, and the like.

In connection with the sandwich vending machines presently available, it is to be noted that generally, such machines will vend only sandwiches which have been previously prepared by the vendor and are merely positioned within a storage chamber within the machine whereby access to the chamber is obtained by inserting the properly sized coins thereby actuating a door release mechanism to afford the user access to the desired sandwich within the storage chamber. Hence, the user can only obtain those sandwiches which have been previously stored in the machine and has no preselection prerogative in selecting the particular type of sandwich which the user may desire.

There presently does exist automated sandwich preparation machines and devices such as exemplified in U.S. Patent No. 3,083,651. In this patent, there is disclosed a sandwich making device which merely functions for the purpose of compressing a sandwich assembled by the operator, thereby to compress the sandwich and simultaneously trim the crust edges from the bread in preparation for inserting the sandwich into a toasting device, such as a conventional toaster which is generally designed to accommodate a single slice of bread. It is clear, however, that the actual preparation of the sandwich is still done manually and that the device merely functions for the purpose of compressing and cutting the sandwich.

In U.S. Pat. No. 3,119,352, there is disclosed a sandwich machine which is designed to prepare sandwich type cookies at an extremely high rate in order to render the operation efficient and economically feasible. The significance of the device disclosed in the U.S. Pat. No. 3,119,352, is the fact that the machinery is designed to turn out only one type of sandwich cookie and the machinery is designed to do this at a very high rate of speed, such that the average price per cookie is reduced due to the efficient and high speed operation of the machinery. There is no suggestion or disclosure of providing a machine which will prepare a sandwich composed of various food ingredients which may be pre-selected by the user thereof.

A patent of greater relevance with regard to this particular art field is U.S. Pat. No. 3,183,856 wherein there is disclosed an apparatus for making and dispensing sandwiches.

It will be noted that the subject machinery is rather complicated in construction and basically functions to prepare only selected type of sandwiches in response to actuation by the deposit of the properly sized coin. The subject machine operates to first dispense a wrapping material upon which is deposited the lower half of the sandwich in timed sequence and the conveyor then moving the bottom portion of the sandwich deposited on the wrapper along a pre-selected path to a third station which will then deposit the meat or other cooked food upon the lower half of the sandwich. It is to be noted that in the containers storing and retaining the meat or other food ingredients there is no mechanism for slicing or cutting a pre-selected thickness of the food ingredient and thereafter depositing the same on the sandwich, and hence, it is necessary that the ingredients stored in the machine be pre-cut in order to be properly dispensed. Therefore, while the user has some selection in terms of the particular type sandwich he may want, the user is not permitted to select between and amongst various meat products within the machine, and hence, is not given a variable selection of a particular sandwich, above and beyond a selection between four types of sandwiches. As disclosed in the U.S. Pat. No. 3,183,856 it is intended to have perhaps four types of sandwiches including hamburgers, sandwich steak, hamburger and cheese, or some other such sandwich. In short, the mechanism is designed to advance the sandwich along a preselected path under a selected food ingredient dispensing chamber which will then dispense that particular food ingredient and hence determine the particular sandwich selected and prepared. The subject machine further includes means to complete the wrapping of the sandwich and to dispense same to the user at the completion of the sandwich preparation cycle.

Still another patent which shows an automated apparatus for making sandwiches is U.S. Pat. No. 3,364,878. The subject device disclosed in this patent involves an automated sandwich making machine which is designed to prepare sandwiches consisting of a lower slice of bread, a filling material intermediate between the lower slice of bread and a top slice of bread. First, it is to be noted that the device disclosed and described therein is designed to merely prepare the same types of sandwiched in an assembly-type manner. There is no indication in the patent that the user of the device would have any choice in terms of sandwich ingredient selection, nor is there any indication that the subject device is actually adapted for vending machine use. Hence, the device as disclosed and claimed represents merely a sandwich making machine which is designed to make a plurality of the same kind of sandwich from the standpoint of efficiency and economical mode of operation, the sandwiches then being wrapped and prepared for use in vending machines and the like.

BRIEF SUMMARY OF INVENTION

The present invention is designed to be applicable in terms of vending machine use and will, at the same time, present the user of making pre-selections of the type of sandwich desired, after which the subject machine is designed to dispense the necessary slices of bread, and dispense the selected food ingredients thereatop and complete the operation with the top slice of bread, and thereafter cut the sandwich and present the same to the user for consumption. Another significant feature of the present invention relates to the fact that the food ingredients which are dispensed are generally fresh and are cut only at the time that the selection is made by the user. Hence, the subject machine presents a usable vending operation which permits variable selection of sandwich types, freshly prepared, and automatically dispensed to the user.

OBJECTS AND ADVANTAGES

It is therefore the principal object of the invention to provide an automated sandwich preparation machine which permits the user to pre-select the desired food ingredients in the sandwich from among a variety of such food ingredients, after which the machine is designed to automatically cut and dispense the necessary food ingredients and dispense a completed sandwich to the user.

Another object of this invention is to provide a machine of the type described above, which includes a first bread source means for dispensing a first slice of bread, a plurality of food ingredient source means mounted adjacent to the first bread source means and each of such plurality of food ingredient source means having a different variety of food products therein, a second bread source means for dispensing a second or top slice of bread after the selected food ingredients have been deposited on the lower slice of bread, and access means to provide the user with access to the completed sandwich when the sandwich preparation cycle has been completed.

Still another object of this invention is to provide an automated sandwich making machine of the type wherein a first bread source means is provided having a plurality of bread chambers to accommodate a variety of bread types, a plurality of food ingredient source means for providing a plurality of food ingredients which may be pre-selected by the user to form a selected sandwich, a second bread source means for providing a second or top slice of bread to the sandwich, the second bread source means also having a plurality of bread chambers to accommodate a plurality of bread types and being mechanically keyed with the first bread source means, such that the two bread source means will automatically dispense the same bread type selected by the user, conveying means disposed beneath the first and second bread source means, and the food ingredient source means, to advance the sandwich ingredients in the various stages of preparation along a linear or longitudinal path until the sandwich has been completely prepared and food ingredient selection control means for permitting the user to pre-select the particular type of sandwich desired in terms of bread type and food ingredient, the first and second bread source means and the food ingredient source means and the conveying means being operatively interconnected such that the conveying means will advance the sandwich ingredients in their various stages of preparation from one stop position to the next stop position, as determined by the pre-selection made by the user through the food ingredient selection control means.

A further object of the present invention is to provide an automated sandwich making machine of the type described above, wherein the food ingredient source means are further provided with cutting means for automatically cutting the food ingredient contained within a food ingredient chamber in response to the selection made by the user through the ingredient selection control means whereby a freshly cut food ingredient is deposited upon the bread slice as the same is moved along by the food conveying means, along the path of travel thereof.

Another object of this invention is to provide an automated sandwich making machine which is further provided with refrigeration means for maintaining the food ingredients in the food chambers under refrigerated conditions, thereby to preserve the freshness and wholesomeness of the food ingredients.

Still another object of this invention is to provide an automated sandwich making machine of the type described above, which is further provided with storage chambers for storing additional quantities of food ingredients and bread types, such that the bread chambers and the food ingredient chambers may be readily re-supplied when exhausted, the refrigeration means being so designed as to maintain the food ingredients positioned in the food chambers under refrigerated conditions, including the additional quantities of meat products stored in the machine, while keeping stored bread products in cool dry storage.

In association with the above-described objects, it is still a further object to provide a machine of the type described wherein the machine includes cutting means for cuttingly halving the sandwich at the terminal end of the preparation cycle such that the user is delivered a completely prepared and cut sandwich through access means provided in the machine.

Still another object of this invention is to provide a machine of the type described above wherein access means is provided in the form of a slidable door to gain access to the interior portion of the machine at the terminal end thereof, whereby the user has access to the completed sandwich, the point of access to the sandwich being removed from the cutting means such that there is no danger to the user in terms of causing injury to his hand when attempting to gain access to the completed sandwich.

Further features of the invention pertain to the particular arrangement of the elements and parts whereby the above-outlined and additional operating features thereof are attained.

The invention, both as to its organization and method of operation, together with further objects and advantages thereof will best be understood by reference to the following specification, taken in connection with the accompanying drawings in which:

FIG. 1 is a perspective view of the contemplated invention showing the device in the form of a vending machine;

FIG. 2 is a top view showing the schematic of the interior portions of the machine including the two bread sources and the food ingredient source means;

Figure 3:
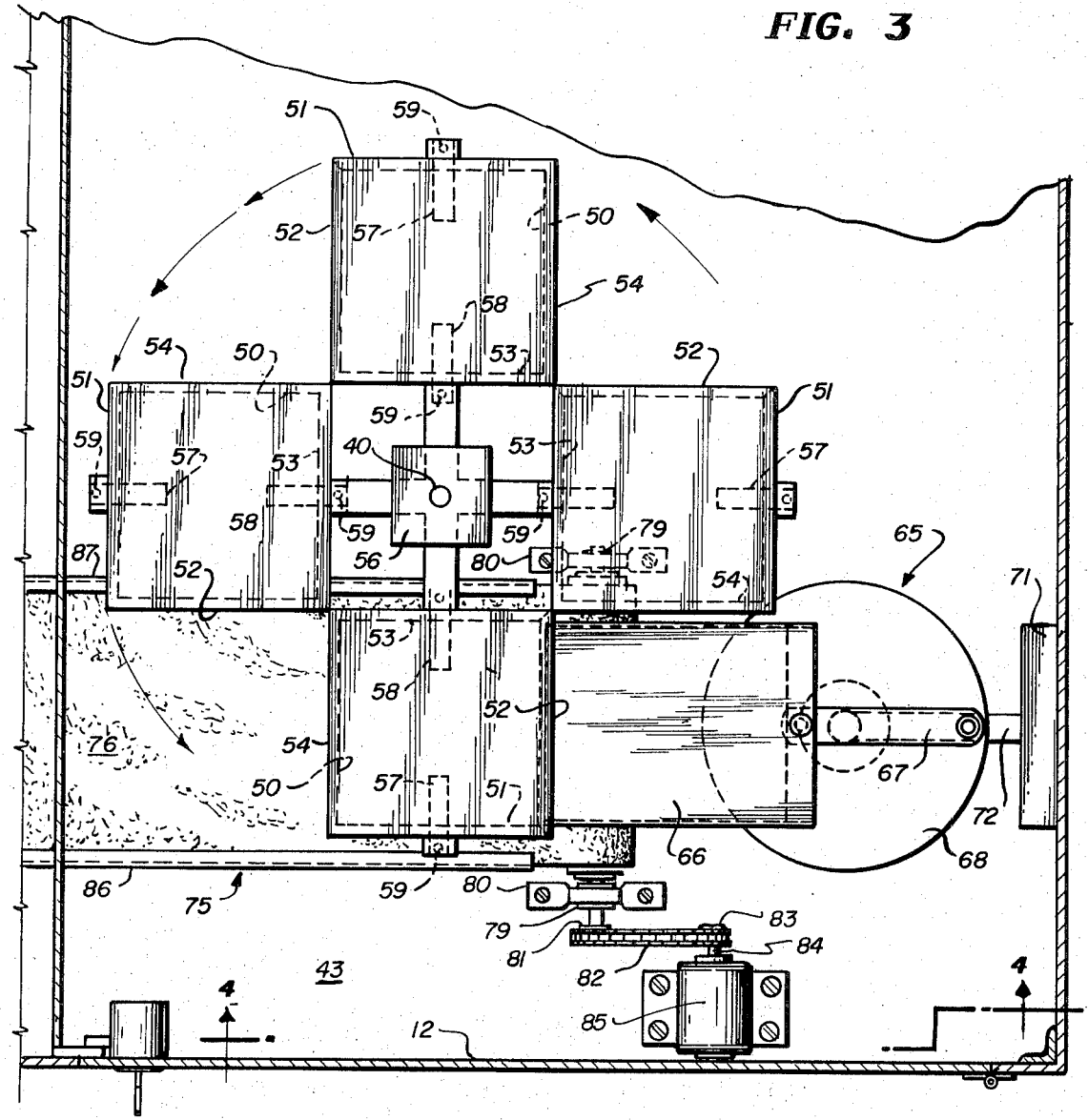
FIG. 3 is a top view, in cross section, showing the details of construction of one of the bread source means and bread slice ejection means.

FIG. 13 is a top view of the second bread source means, including a plurality of four bread chambers and the bread ejection means, as well as the sandwich platform retractable into a cutting position and an access position within the device; and FIG. 14 is a side elevational view, partly in cross section, showing the details of construction of the retractable platform carrying a completed sandwich prior to retraction into the cutting position for delivery of a completed and cut sandwich to the user.

Referring now more specifically to the drawings, and FIG. 1 thereof, the subject machine is shown in the form of a vending machine 10 including a housing 11, which is purportly compartmentalized. The housing 11 is shown to include a first door 12, which affords access to the first bread source means, a center panel door 13, which affords access to the food ingredients chambers, as well as the coin actuated control panel 14, and a second door 15, which permits access to the second bread source means, as well as incorporating therein an access door 16, for permitting the user access to the sandwich. The lower portion of the vending machine 10 includes a first bread storage door 17, which affords access to a first bread storage compartment, a refrigeration door 18, which affords access to the refrigeration units for the machine 10, and a second bread storage door 19 which affords access to a second bread storage compartment. The size dimensions of the vending machine 10 may vary and are only determined by the size considerations to be given to the bread source means, the size of the storage compartments desired, the size considerations of the refrigeration units, and the number of food ingredient sources desired, although the present embodiment contemplates five such food ingredient sources means.

The coin actuated control panel 14 includes a plurality of buttons 20, which permit the user to select the bread type desired as well as the particular food ingredient desired in the sandwich on actuation of the device, through the insertion of a properly sized coin in the coin slot 21. The present embodiment contemplates utilizing a bread source means including a series of four bread chambers, each of the bread chambers accommodating and carrying a different type of bread, such as white, wholewheat, rye, or the like. Hence, the user may select a particular bread type which is desired by merely pushing one of the buttons 20, after the properly sized coin has been inserted into the coin slot 21. In terms of food ingredients, the present invention is contemplated to have a series of five ingredients source chambers each of the chambers having a different food ingredient operationally disposed therein, provided with cutting means for cutting a predetermined thickness of that food ingredient and depositing same onto the sandwich as it moves across the linear path of the food ingredient source chamber. As stated, with respect to the particular bread type desired, the user may select the food ingredients desired by once again pressing the proper buttons 20, after the insertion of a coin in the coin slot 21, and after making the bread selection, which will automatically cause the first bread slice deposited on the conveying means to come to a stop position under the food ingredient chamber selected, thereby to cut and receive the desired food ingredient. Finally, the sandwich ingredients will move along the conveyorized path to the second bread source means which will deposit the top slice of bread onto the sandwich for completion of the sandwich. The first and second bread source means are interconnected and keyed such that once a bread type has been selected by the user, via the control panel 14, and the corresponding bread chamber is positioned over the conveyor, the same movement is achieved by the second bread source means such that a corresponding bread chamber having the same type of bread type therein is similarly rotated in position over the conveyor such that the top slice of bread of the sandwich will be the same as the bottom slice deposited by the first bread source means.

The completed sandwich is pushed onto a retractable platform which will retract into a cutting position, to cuttingly halve the sandwich, after which the retractable platform will then move into an access position, immediately behind the access door 16 and afford the user the opportunity of opening the access door 16 and gaining access to the completed and cut sandwich.

FIG. 2 shows, schematically, the overall stations of the machine, including the four chambered first bread source means 30, a series of five food ingredient source means 31, the second bread source means 130 the conveyor means 75 which is disposed beneath the first bread source means 30, the food ingredient source means 31, and the second bread source means 130 and the relative position of the sandwich retractable platform 185 which is retractable into a cutting position 36 and retractable back into an access position 37. The access position 37 of the retractable platform 185 is shown to be disposed immediately behind an access door 16, thereby to provide the user with access to the completed and cut sandwich. There is also shown a series of storage positions 38 wherein additional quantities of food ingredients are stored. Hence, it will be appreciated that the overall functioning of the machine 10 is basically very simple and economical while still affording the user a wide variety of sandwich selection.

With regard to FIG. 3 of the drawings, the details of construction of one of the bread source means is illustrated. The first bread source means 30 is shown to be rotationally mounted on a shaft 40 having the lower end thereof journalled in a bearing-containing sleeve 41, and the upper end thereof journalled in a shaft mounting 42, (see FIG. 5). The bearing sleeve of 41 is mounted to a top base plate 43 by means of a bolt and nut arrangement, the top base plate 43 separating the food ingredient compartments from the lower storage and refrigeration compartments as will be appreciated from FIG. 1 of the drawings. The shaft mounting 42 is mounted to the top wall 44 of the housing 11 by means of a pair of bolts such that the first bread source means 30 is rotationally mounted within the housing 11. The rotational movement of the shaft 40 is accomplished by means of a chain belt 45, which interconnects a toothed wheel 46 which is fixedly secured to the shaft 40, and a motor toothed wheel 47, carried by a motor 48, which is mounted within the housing by means of a motor mount 49. The motor 48 may be conveniently electrically wired to the coin actuated control panel and more specifically to specific control buttons 20 carried thereon such that the user selection of a particular bread type will cause the motor 48 to rotate the bread source means such that an appropriate chamber is disposed in the dispensing position.

Figure 5:
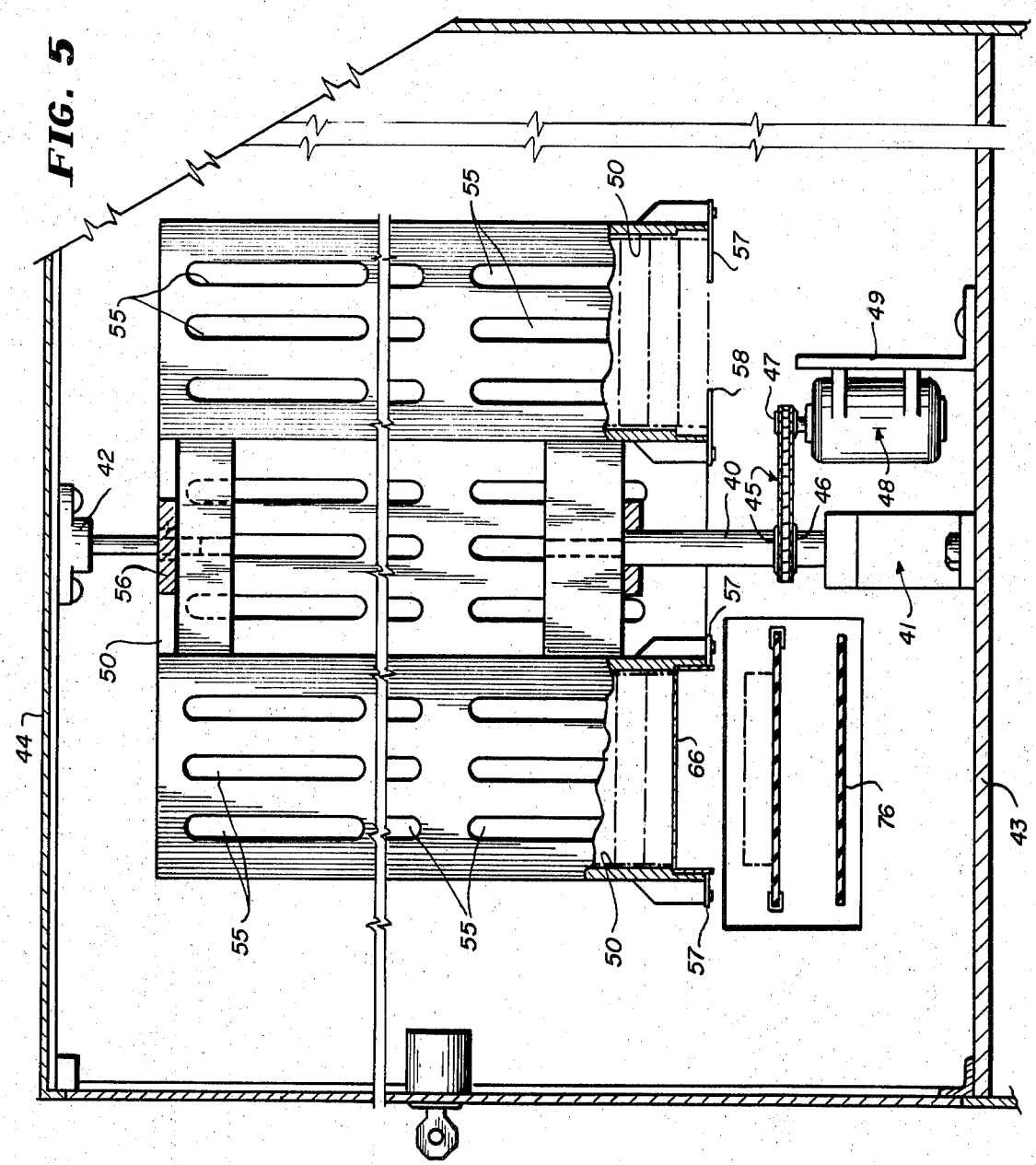
FIG. 5 is a side elevational view, partly in cross section, showing the details of the construction of the bread storage chambers mounted for rotational movement within the machine.
Figure 6:
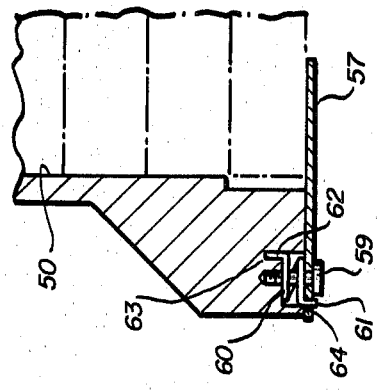
FIG. 6 is a side elevational view, partly cut-away and in cross section, showing the holding means for holding the bread slices within a bread chamber in the retained position.
Figure 7:
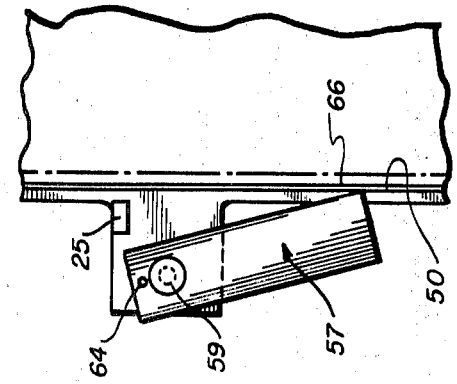
FIG. 7 is a top view showing the bread holder means in the operated position in combination with the bread separator such that a slice of bread is dispensed therefrom.

The bread source means 30 is shown to be comprised of a series of four bread chambers 50, each of which is substantially identical in construction and consists of a series of four side walls 51, 52, 53 and 54 respectively, forming a substantially square chamber. As shown in FIG. 5 the side walls are each provided with slotted apertures 55, thereby to provide air spaces which function to preserve the freshness and refrigerated condition of the bread stored therein. Each of the four bread chambers is kept in fixed relationship with respect to one another by top and bottom spiders 56 which are in turn fixedly secured to the shaft 40. In addition, each of the chambers is provided with a pair of opposed holding tabs 57 and 58, which are pivotally secured to the lower ends of the chambers 50 by means of rivets 59. The holding tabs 57 and 58 are laterally pivotable and will function to pivot out of the holding or retaining position by the bread slice ejection means 65 in a manner to be described hereinafter. As shown in FIG. 6 of the drawings, each of the holding tabs 57 and 58 is pivotally mounted to the lower end of the bread chamber 50 by means of a rivet 59 and further includes a spring 60 which is held in fixed securement by outturned ends 61 and 62 respectively, which are journalled in a chamber aperture 63 and a holding tab aperture 64 respectively. The spring 60 normally retains the holding tab 57 in a retaining position as shown in FIG. 6 of the drawings, wherein the bread slices are held within the chamber 50 in stacked disposition. The proper alignment of the holding tab 57 in its retaining position is facilitated by means of a holder stop 25.

Figure 4:
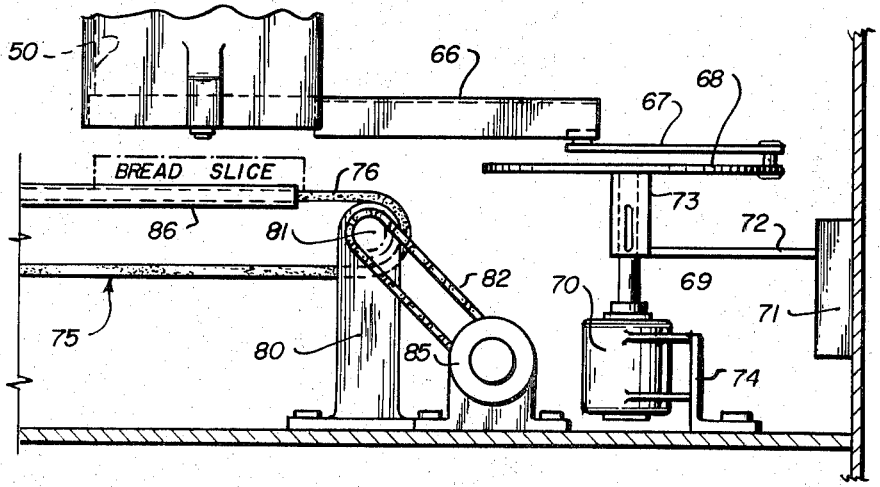
FIG. 4 is a side elevational view, partly in cross section, showing the mechanical details of the bread separator and ejection means and of the conveying means for the machine.

The bread slice ejection means 65 includes a bread separator shelf 66, which is constructed in the form of an inverted U shaped configuration. The forward end of the shelf 66 is designed to slide within the lower end of the bread chamber 50 in the manner shown in FIG. 5 of the drawings, while the rearward end of the shelf 66 is shown to be pivotally secured to an arm 67 (FIG. 4) the shelf arm 67 being in turn pivotally secured to a cam plate 68. The cam plate 68 is fixedly secured to a motor shaft 69, rotatingly carried by a motor 70, which when actuated, causes rotation of the motor shaft 69 and the cam plate 68 whereupon the shelf arm 67 is pushed forwardly and in turn, pushes the bread separator shelf 66 into its operative position into the bread chamber 50. The mechanism further includes a raise-lowering cam 71 having a cam arm 72 extending outwardly therefrom and operatively connected to a support sleeve 73 which is in turn fixedly secured to the cam plate 68. In this manner, the bread slice ejection means 65 may be raised and lowered into and out of operative working positions. The motor 70 for driving the cam plate 68 and in turn, the bread separator shelf 66, is mounted to the top base plate 43 by a motor mount 74. The actuation of the motor 70 is caused by the insertion into the vending machine 10 of a properly sized coin and upon selection of the particular bread type desired via a corresponding control button 20 on the control panel 14, hence causing the support sleeve 73 to be raised into operative working position and the cam plate 68 to be rotated, causing a concomitant movement of the shelf arm 67 and forward movement of the bread separator shelf 66 to separate a single slice of bread from the chamber 50.

In operation, as the bread separator shelf 66 is slid into separating position within a chamber 50, the holding tabs 57 and 58 are pivoted out of retaining position, while at the same time the upper surface of the bread separator shelf 66 then performs the retaining function for retaining the remaining slices of bread within a bread chamber 50 in position therein. Hence, the only bread slice which is permitted to be dispensed from the chamber 50, is the bottom most slice which is separated from the remaining stack by the separator shelf 66. The relative relationship between the bread separator shelf 66, and an operative chamber 50, and holding tabs 57 and 58 respectively, is shown in FIG. 3 of the drawings. As shown therein, the bread separator shelf 66 is shown retracted and in operative position with the holding tabs 57 and 58 maintained by the spring 60 in retaining and holding posture.

The conveyor assembly 75 is shown in FIGS. 3, 4, 5, 6, 9 and 12 of the drawings. The conveyor assembly 75 includes a conveyor belt 76 which is journalled about a pair of end rollers 77 (the opposed end roller not shown) each of the end rollers 77 having a rotational shaft 78 fixedly secured thereto and having the forward edge extending outwardly therefrom. A bearing wheel 79 is fixedly secured to the shaft 78 and held in position by means of a pair of opposed end supports 80 which are mounted upon and fixedly secured to the top base plate 43 by means of appropriate bolts. The forward end of the rotational shaft 78 is provided with a toothed wheel 81 which carries a chain belt 82 which also surrounds a motor toothed wheel 83, carried on motor shaft 84, which in turn extends outwardly from motor 85. The motor 85 is similarly mounted to the top base plate 43 by appropriate bolts as depicted in FIG. 3 of the drawings. The motor 85 is appropriately electrically wired to the coin actuated control panel 14 whereby the motor 85 will drive the conveyor belt 76 to a plurality of stop positions to receive bread slices and food ingredients in response to the buttons 20 operated by the user in selecting the particular sandwich desired.

The opposed end roller 77 of the conveyor assembly 75 obviously is not provided with any motor driven means since only the one motor 85 is necessary in order to drive the conveyor belt 76. In the preferred embodiment the conveyor is made of stainless steel formed of a plurality of small continuous links of chain, and overall the conveyor has a width of approximately 5 ½ inches. In order to ensure that the sandwich ingredients remain on the conveyor belt 76 a pair of lateral conveyor guides 86 and 87 respectively are provided along the length of the conveyor assembly 75.

With reference to FIGS. 8 through 12 of the drawings, the details of construction of each of the food ingredient source means 90 is illustrated. The compartment containing the food ingredient source means 90 is separated from the first bread source means 30 by means of a compartment wall 91. Each food ingredient source means 90 is shown to consist of an elongated rectangular chamber 92 formed by a series of four side walls, and mounted within the housing in the manner shown in FIG. 9. The housing 11 is shown to include the mounting therein of a plurality of eye beams 93 to support thereatop a pair of support arms 94 which extend upwardly for a relatively short distance. Each of the support arms 94 is tapered outwardly from top to bottom for a purpose to be more fully described hereinafter. Each of the two opposed lateral side walls of each food chamber 92 includes a pair of support clips 95, which are tapered downwardly having the longest dimension of the taper adjacent the bottom end and the shortest dimension of the taper adjacent the upper end of each of the clips 95. Hence, in order to mount each of the food chambers 92 within the housing 11, each opposed pair of support clips 95 is slidingly engaged onto the support arm 94, and the taper of each of the support arms 94 and support clips 95 mating to provide a tight friction fit. Hence, each of the food chambers 92 is removably positioned within the housing 11, such that each food chamber 92 can be removed for resupplying purposes when the food supply contained therein has become exhausted.

The lower surface of each of the eye beams 93 carries a slide guide 96 which guides the movement of the bottom cover plate 97, for each of the chambers 92 as well as the cutting knife 100, for each of the aforementioned food chambers 92.

Once again, in the preferred embodiment, the upper ends of each of the food chambers 92 includes a down pressure mechanism 98, which may be in the form of a spring-loaded pusher shelf or in the form of a counterweight. The purpose of the down pressure mechanism 98 is to ensure that the foodstuffs contained within each of the food chambers 92 is pushed downwardly such that a good cutting relationship will always be established with the cutting knife 100 provided for each of the food chambers 92.

Figure 8:
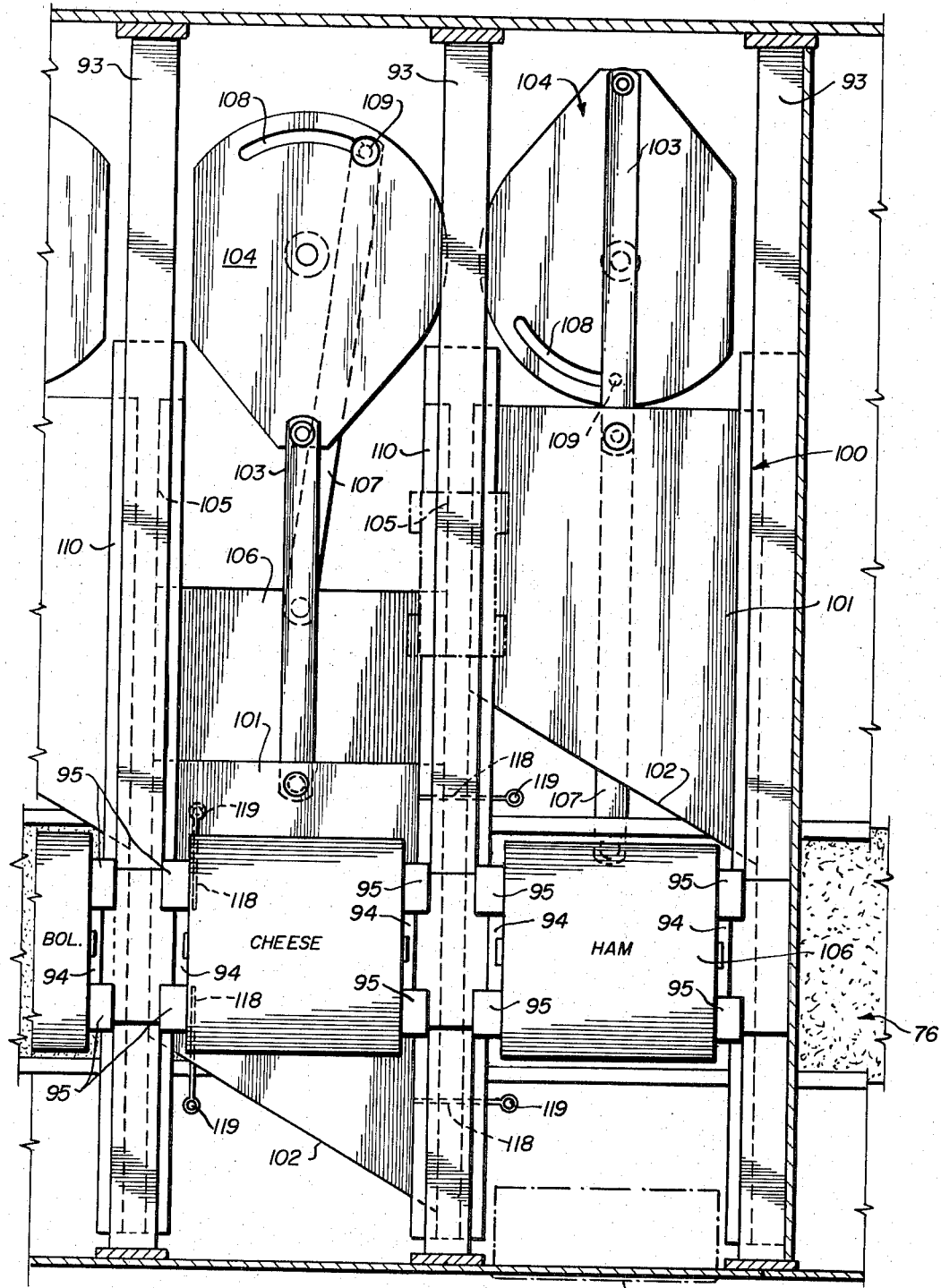
FIG. 8 is a top view, partly in cross section, showing the details of construction of a pair of food ingredient chambers and the cutting means associated therewith for cutting the food ingredients during the operation of a sandwich preparation cycle.
Figure 9:
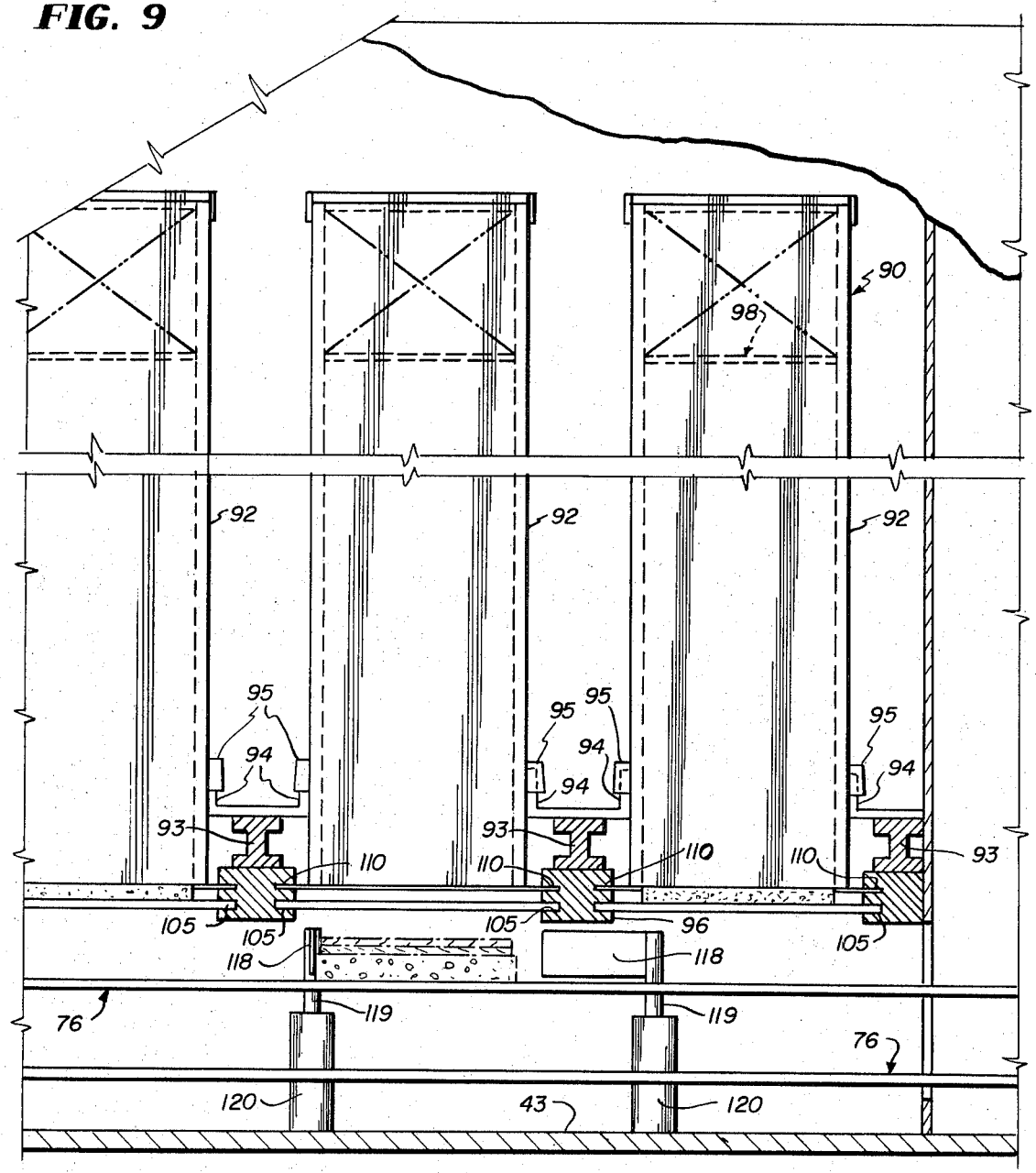
FIG. 9 is a side elevational view, partly in cross section, showing the details of construction of several of the food ingredient chambers in relation to the conveyor means disposed therebeneath and the manner in which the food ingredients are deposited onto the sandwich carried by the conveyor means.
Figure 10:
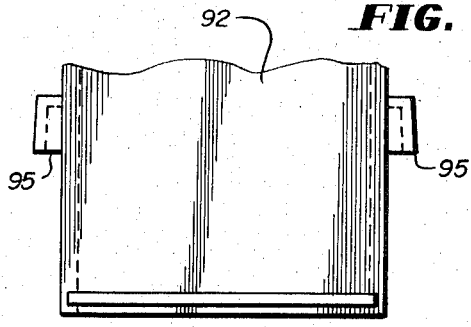
FIG. 10 is a side elevational view, partly in cross section, showing the details of construction of the lower portion of one of the food ingredient chambers.
Figure 11:
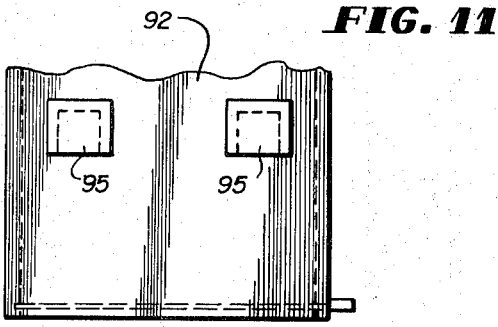
FIG. 11 is a side elevational view, partly in cross section, showing the side wall mounting means of one of the food ingredient chambers.

The details of construction of each of the food chambers and the related cover plates and guillotine knives is shown in FIG. 8 of the drawings. Each food chamber 92 is shown to be mounted in position by means of the support clips 95 which are carried on corresponding support arms 94, carried by the eye beams as previously described. The conveyor belt 76 is shown to pass immediately below the food chambers 92, and as previously described, may be wired to the coin actuated control panel 14 such that the conveyor belt 76 will be caused to stop under the appropriate food chamber 92 as dictated by the selection made by the user having pushed the proper control buttons 20, in selecting the food ingredients desired. In the embodiment of the invention presently contemplated, each of the food chambers 92 contains a food ingredient which must be cut in order to be dispensed upon the bread slice which is carried by the conveyor belt 76. In order to effect this cutting operation, a knife mechanism 100 is provided for each of the food chambers 92. The knife mechanism 100 includes a planar member 101 having a leading edge 102, which is annularly disposed and honed to a knife edge thereby providing the cutting means. The rear end of the planar member is pivotally secured to a knife arm 103 which is in turn pivotally mounted to a cam plate 104. As the cam plate 104 turns, the knife arm 103 is pushed forwardly, thereby pushing the planar member 101 and the leading edge 102 thereof, forwardly through the food ingredient. The lateral edges of the planar member 101 are carried in a pair of opposed knife slots 105 carried along the lateral sides of the slide guide 96. In order to retain the food ingredients within the food chamber 92, a bottom cover plate 106 is provided which is fixedly secured to a cover plate arm 107, the rear end of the cover plate arm being pivotally secured to the cam plate 104, in an arcuate slot 108 provided therein, the cover plate arm 107 being held in position in the arcuate slot 108 by means of a rivet 109. The arcuate slot 108 is disposed in opposed relation with respect to the pivotal mounting of the knife arm 103 whereby upon rotation of the cam plate 104, and as the knife arm 103 is caused to move forwardly, thereby moving the planar member 101 and the leading edge 102 thereof forward into cutting relationship with respect to the food ingredients, the cover plate arm 107 is caused to be retracted by movement of the rivet 109 in the arcuate slot 108 and by movement of the cam plate in a rotational direction, such that the bottom cover plate 106 is retracted from closed position with respect to the corresponding food chamber 92 as the leading edge 102 and the planar member 101 thereof move into cutting contact and begin to slice through the food ingredient. During the cutting operation, the top surface of the planar member 101 functions to retain the balance of the food ingredient mass within the chamber 92 as a predetermined thickness if sliced off the bottom of said mass of food. The bottom cover plate 106 is similarly contained within a pair of opposed cover plate guides 110 cut into the lateral sides of the slide guide 96.

Figure 12:
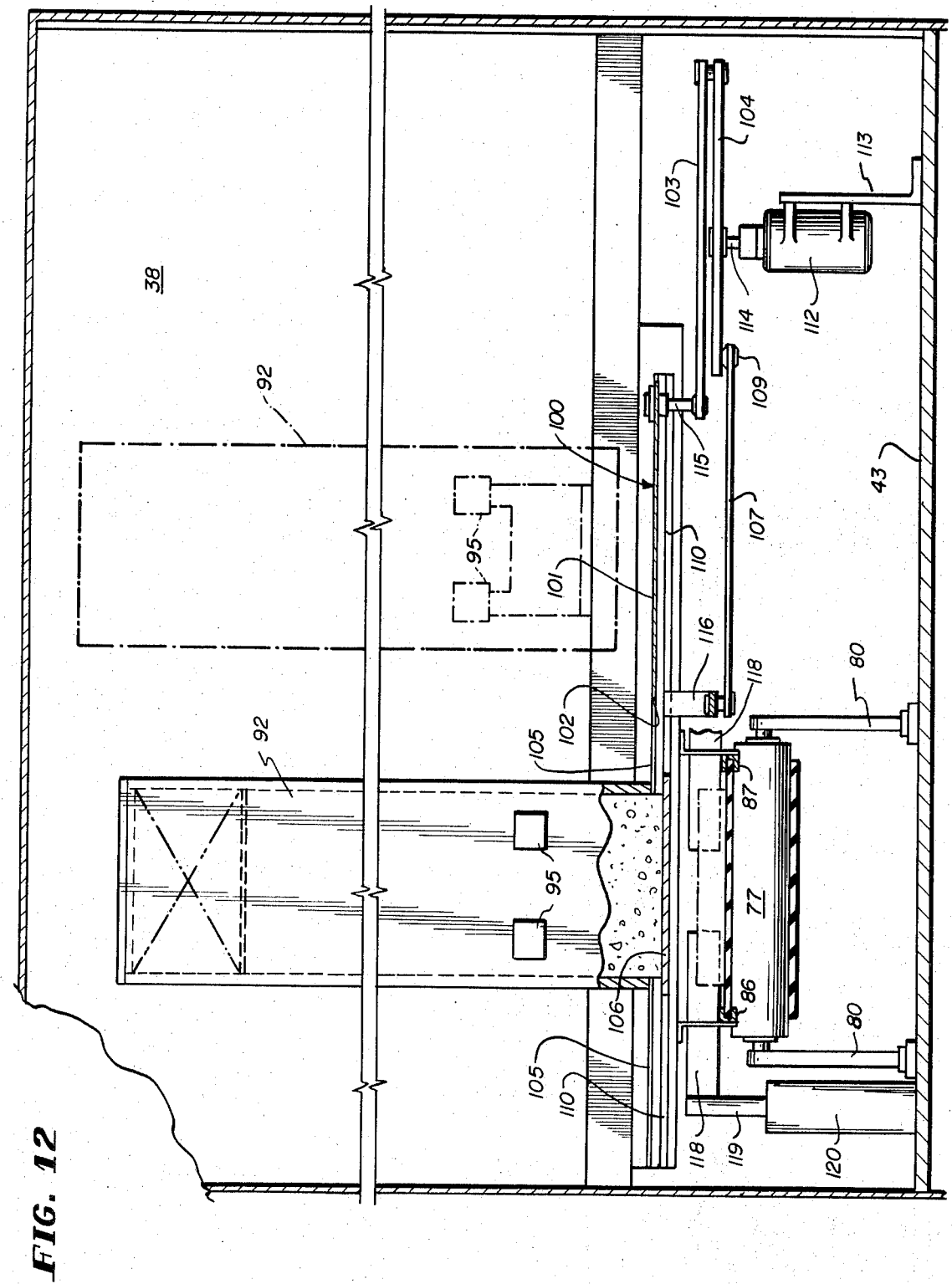
FIG. 12 is an end elevational view, partly in cross section, showing the details of construction of the interior portion of the machine housing, including one of the food ingredient storage chambers, the conveyor means, and the cutting means associated with the food ingredient storage chamber for cutting food ingredients prior to deposition onto the sandwich.

As shown in FIG. 12, each of the knife mechanisms is motor driven by means of a motor 112, which is mounted to the top base plate 43, by a suitable motor mount 113. The motor 112 includes a rotating shaft 114 extending outwardly therefrom and secured to the cam plate 104 such that rotation of the rotating shaft 114 causes a concomitant rotation of the cam plate 104. As mentioned above, the rotation of the cam plate 104 will cause the sequential movement of the knife arm 103 in a forward direction to move the planar member 101 and the leading edge 102 thereof into cutting relation with the food ingredient in the corresponding food chamber 92 while at the same time causing the cover plate arm 107 to be retracted or pulled backwardly causing a concomitant retraction of the bottom cover plate 106 from retaining position with respect to the food ingredient contained in the corresponding food chamber 92 as the cutting edge 102 of the knife mechanism 100 commences the cutting cycle into and through the food ingredient. The knife arm 103 is shown to be connected to the planar member 100 by means of a knife ram 115, and similarly, the cover plate arm 107 is shown to be connected to the cover plate 106 by means of a plate ram 116. The opposed knife slots 105 guiding the planar member 101 are so positioned in the slide guide 96 as to cause the knife mechanism 100 to slice the food ingredient and create, in the preferred embodiment, a three/thirty-seconds of an inch cut of the food ingredient which is then deposited upon the lower slice of bread previously deposited onto the conveyor belt 76, by the bread slice ejection means 65 in the manner previously described. Generally, a sufficiently large space between the top surface of the slice of bread deposited on the conveyor belt 76 and the lower edges of each of the food chambers 92 is provided to accommodate the stacking of meat ingredients on the slice of bread as the sandwich ingredients move along the path of travel on the conveyor belt 76. Generally, a space of approximately one inch is sufficient to accommodate the stacked relation of food ingredients thereon.

In order to further ensure that the lower slice of bread is accurately positioned under the appropriate food chamber 92, a pair of opposed stoppers, 118 is provided on opposed sides of the conveyor belt 96. Each stopper 118 consists of a gate which is pivotally mounted on a shaft 119, the lower end of the shaft 119 being rotationally carried by an activator 120. Each of the activators 120 is appropriately electrically wired to the control panel 14 such that upon the users selection of the desired food ingredient, the appropriate stoppers 118 are activated to enter into the stop position under the corresponding food chambers 92 such that as the bread slice advances to the chamber 92, the bread slice will be stopped at an exact position directly beneath the food chamber 92 and accept the deposition of the food ingredient thereon. If desired, the conveyor belt 76 can continue to move while the stoppers 118 are positioned in the stop position, thereby to stop the bread slice under the food chamber 92 and accept deposition of food thereon during the sandwich preparation cycle. Alternatively, and in the preferred embodiment, the conveyor belt motor 85 is also wired to each of the activators 120 such that there is a timed stopping of the conveyor belt 76, as well as the engagement of the stoppers 118 into the stop position when the slice of bread has arrived at each of the designated food chambers 92 and has accepted the deposition of the desired food ingredient thereon.

In FIG. 13 of the drawings there is shown the second bread source means 130 which is constructed identically with the first bread source means 30. Once again, the bread source means 130 is carried on a shaft 140 which is mounted between a bearing sleeve and a shaft mounting (neither of which is shown). The second bread source means 130 includes a series of four bread chambers 150, each of the bread chambers 150 formed from a series of four side walls 151, 152, 153 and 154 respectively. Once again each of the side walls 151, 152, 153 and 154 are slotted in the same manner as indicated for the first bread source means 30 to provide air spaces for freshness and refrigeration purposes. The mouning of the four bread chambers 150 to the shaft 140 is accomplished by top and bottom spiders 156, such that the four bread chambers 150 are held in fixed relative position, one with respect to the other.

The same means for holding the bread slices in position within each of the bread chambers 150 is utilized, namely a pair of holding tabs, 157 and 158 respectively are provided in opposed relation, each of the holding tabs 157 and 158 being pivotally mounted on the lower ends of the corresponding bread chambers 150 by means of rivets. Again, each of the holding tabs 157 and 158 are spring-loaded such that the spring normally retains each of the holding tabs 157 and 158 in the normally closed position. Ejection of the lowermost slice of bread is accomplished by a bread slice ejection means 165 which is formed by a bread separator shelf 166 pivotally secured to a shelf arm 167, which is in turn pivotally mounted on a cam plate 168. The cam plate is motor driven in the same manner described with respect to the first bread slicing ejection means 65. In addition, the motor mechanism for the second bread source means 130 is operatively connected, either electrically or mechanically with the motor 70 of the first bread source means 30, such that the two bread source means 30 and 130, when actuated will rotate in the same direction and will position the same relative bread chambers 50 and 150 above the conveyor belt 76. This is important, since it is necessary that when the user selects a particular bread type, that the first bread source means 30 providing a lower slice of bread for the sandwich and the second bread source means 130 providing a top slice of bread for the same sandwich dispense the identical types of bread. Hence, there is an interconnection and operative relationship between the two bread source means 30 and 130 in order to accomplish this function. Once the second bread source means 130 has deposited the top slice of bread for the sandwich, the sandwich is then moved from the conveyor belt 76 onto the retractable platform 180 by means of a pusher assembly 170. The pusher assembly 170 is shown to include the longitudinal arm 171 which is fixedly secured to the lateral arm 172, the lateral arm 172 having a series of ratchets 173 positioned adjacent the rear end thereof. A ratchet wheel 174 is rotationally secured such that the ratchet wheel 174 and the ratchets 173 are in mating engagement. The ratchet wheel 174 is motor driven, the motor being wired into the complete control cycle for the sandwich preparation sequence, whereupon once the second bread source means 130 has deposited the second slice of bread on top of the sandwich the motor driving the ratchet wheel 174 is actuated causing the rotational movement thereof against the ratchets 173 to drive the lateral arm forward and hence, drive the longitudinal arm 171 forwardly. The longitudinal arm 171 will then move across the conveyor belt 76 and push the sandwich forwardly onto the retractable platform 180. The retractable platform 180 is in turn motor driven along a track 181 by means of a motor 182, carrying a shaft 183 with a ratchet wheel 184 mounted thereon. The ratchet wheel 184 mates with a plurality of ratchets disposed along the lower portion of the retractable platform 180 such that the rotational movement of the shaft 183 and the ratchet wheel 184 will cause the lateral movement of the retractable platform 180 from an access position as shown in FIG. 13 of the drawings to a cutting position as shown in FIG. 14 of the drawings.

A cutting assembly 185 is shown to include a peripheral skirt 186 forming a sandwich chamber therebeneath and having a cutting knife 187 mounted therein. Once the retractable platform 180 has been moved into the cutting position, the cutting assembly 185 is caused to ride downwardly from a track 188 with the cutting knife 187 making contact with the sandwich and the peripheral skirt 186 comes down and surrounds the sandwich until the sandwich is accordingly cut, the peripheral skirt 186 holding the sandwich in position during the cutting operation. Once the cutting operation has been completed, the motor 182 is once again actuated whereby the shaft 183 and ratchet wheel 184 are operated to move the retractable platform 180 into the access position as shown in FIG. 13 of the drawings, whereupon the user may then open the access doors 16 to gain access to the sandwich positioned on the retractable platform 180.

In the preferred embodiment of the described machine, the bread chambers 50 and 150 are each designed to be 26 inches high, 12 ¾ inches across, and consisting of four individual bread chambers approximately 4 ¼ inches by 4 ¼ inches. It has been found that these dimensional sizes will accommodate the commonly sold sandwich bread sizes and are hence sufficient for the purposes intended. It has further been found that the provision of four bread chambers 50 and 150 respectively will accommodate two compartments for white bread, one compartment for rye bread and one compartment for whole wheat bread. From a marketing standpoint, it is felt desirable to have two compartments for white bread, since this is generally the preferred bread type of many consumers. Hence, by providing two such chambers, for white bread, the necessity for constantly refilling is minimized.

Each of the planar members 101 and cover plates 106 are preferably approximately 1 ½ inches in length and 2 ½ inches in width. As mentioned previously, the planar member 101 having its leading edge 102 functioning as the cutting knife should be positioned a minimum of one inch above the conveyor belt 76 in order to provide sufficient space for the stacking of food ingredients as the sandwich is prepared along the conveyor belt 76. As further indicated previously, the opposed knife slots 105 function to accurately maintain the planar member 101 in a fixed position relative to the conveyor belt 76 and assure that the same size slice of meat is cut with each cutting operation.

Once again, in the preferred embodiment, it is contemplated to have four food chambers 92, each of the food chambers 92 containing a different type of meat product. For example, it is contemplated that such meats as ham, bologna, salami, and possibly brick cheese can be contained within the four chambers 92, in order to provide the user with a variety of sandwich styles. It is significant that each of the mechanisms including the knife mechanism 100 and stoppers 118 are related to each of the food chambers 92, and ultimately electrically connected to the coin actuated control panel 14, in such a manner that the user would be permitted a selection of any two meats contained within any of the food chambers 92. In other words, the user, upon depositing his coin in the coin slot 21, then selects the bread type desired as well as the two particular meats which the user desires. In this connection, the user may select the same meat for the two slices or may select any two combinations of the four meats present. In each case, the user would push an appropriate control button 20, contained on the control panel 14, which would be labelled with the corresponding food ingredient contained within each of the food chambers 92. The manual actuation of the appropriate control button 20 would then cause the corresponding motors for the bread source means 30 and 130 and the knife mechanism 100, and the activators 120, as well as the conveyor assembly 75, to activate and select the proper bread type as well as predetermining the stop positions along the pathway such that the sandwich is caused to stop under the proper food ingredient chamber 92 and accept the selected cuts of meat, the completion of the sandwich being the dispensing of the top slice of bread and the cutting of the sandwich into the appropriate halves, as mentioned above.

The fifth food chamber may, if desired, contain a pickle slab, such that the sandwich may be provided with a freshly cut pickle. The pickle food chamber 92 would be the last food chamber in the lineal series and would be constructed identically to the other food chambers as described above. It is contemplated that the pickle food chamber 92 would also have a knife mechanism 100 for cutting a fresh pickle slice in the same manner as described with regard to the other food chambers 92. In such a case it is contemplated that the machine would automatically dispense the pickle to complete the sandwich prior to the top slice of bread being deposited thereon, unless and until the user desired no pickle. In such an event, there would be a 'no pickle' control button on the control panel 14 which would have to be actuated in order to prevent the pickle being deposited on the sandwich. It is believe that the electrical connection of the motor driving the knife mechanism 100 for the pickle chamber 92 could be appropriately wired to accomplish this result.

As schematically represented in FIG. 2 of the drawings, it is contemplated that food storage chambers 38 would be provided to store additional quantities of the food ingredients utilized in the machine. These food chambers may be appropriately positioned behind the operational food chambers 92, or alternatively a top shelf may be provided immediately above the operational food chambers 92, such that additional quantities of food may be stored in an upper position upon a support shelf. Similarly, it is contemplated that bread storage chambers are provided in the lower portion of the machine adjacent either side of the refrigeration equipment which would be in the central portion of the machine, access to which is obtained through a refrigeration door 18. It is contemplated that the refrigeration unit contained within the chamber should be sufficient to refrigerate the food ingredients contained within the operational food chambers 92, including those food ingredients such as meat products stored above or behind the operational food chambers. It is believed that the stored bread products contained within the lower food storage chambers should not be refrigerated since bread has a tendency to harden somewhat under refrigerated conditions. Sufficient refrigeration or coolness for the stored bread products would still emanate from the refrigeration chamber, even through the insulated wall members separating the bread storage chambers from the refrigeration chamber to keep the bread cool and dry.

Alternatively, refrigeration equipment could be provided to keep all chambers within the machine under refrigerated conditions. In such an event, each of the separate chambers in the machine could be provided with a separate thermostat to control the interior temperature of that particular chamber. In short, the provision of refrigeration for one or more of the chambers within the machine is dictated solely by the necessary conditions required for the wholesome preservation of the foodstuffs utilized within the machine.

With regard to the operation of the knife mechanism 100, and the interworking of the planar member 101 in relation to the bottom cover plate 106 of each of the knife mechanisms 100, it is obvious that once the planar member 101 is actuated to move into the cutting position with the leading edge 102 slicing into the corresponding food product, the bottom cover plate 106 would be pulled into a retracted position in timed relationship with the movement of planar member 101 into and through the food product. Similarly, once the planar member 101 has completed the cut, and has assumed the position as shown in FIG. 8 of the drawings, wherein the cheese food product is illustrated, the continued rotation of the cam plate 104 then causes the retraction of the planar member 101 from cutting relation with the food product, and the corresponding forward movement of the bottom cover plate 106 back into a supporting position. This position of the elements is shown in FIG. 8 of the drawings, in connection with the food product labelled as "ham" therein. This is obviously necessary since it is important to retain and support the remaining portions of the food ingredients contained within the appropriate food chamber 92, at all times.

With regard to resupplying the exhausted chambers, it is optional to provide sensing means, such as an electric eye mechanism which would sense the level of each of the food products in each of the food chambers 92, and be, in turn, wired to exhaust lights mounted on the exterior portion of the housing 11. In this manner, as the food supply of any particular food chamber 92 reaches a low level, the electric eye would automatically activate a light on the front portion of the housing 11 to alert the operator that a resupply is necessary. This feature is, of course, optional, but is within the contemplation of the present invention.

It is believed that by utilizing bricks of meat products which are cut only in response to user selection, the meats will remain in a fresher condition and hence, the sandwich will have a better quality than sandwiches presently prepared by precut meats, or sandwiches which have been previously prepared and inserted into a vending machine. Furthermore, the resupply of any exhausted food chamber 92 is easily accomplished since meats in brick form may easily be purchased from the suppliers thereof in shapes which generally conform to the present shape of each of the food chambers 92. In order to resupply any of the meat food chambers 92, the operator need only remove the necessary food chamber 92 by disengaging the support clips 95, from the support arm 94, and removing the chamber from the housing 11. It will be noted with respect to FIG. 1 of the drawings, that a center panel door 13 is provided which may be unlocked and opened in an upward direction, thereby to provide access to the food chambers 92. Once the food chamber 92 has been removed from the unit an additional quantity of brick meat can be obtained from the appropriate storage chamber and dropped into the chamber 92, whereupon the chamber 92 may then be reinstalled into the unit.

In terms of the materials used to form the various parts of the interior portions of the machine, it is contemplated than stainless steel should be adequate and would comply with most health requirements. Hence, all interior separation walls, base plates, cutting knives, and the like, may be formed of stainless steel in order to permit ease of cleaning and comply with health requirements.

It is apparent from the above description that there has been provided by virtue of the present invention, an improved automatic machine for preparing sandwiches utilizing fresh food ingredients. The subject machine is further designed to afford the user thereof a wide variety of selections between and amongst not only bread types, but sandwich ingredients, while at the same time dispensing a freshly prepared sandwich. Furthermore the above advantages are obtained while still providing a vending machine type unit which is adaptable to all forms of coin operated usage presently in vogue. It is also apparent that the subject machine permits carefree operation without the need for any manual labor, with the exception of resupplying any exhausted bread or food chambers at such time as the level of food ingredients therein has reached a low level, or is completely exhausted. It is also apparent that the sandwich preparation cycle is fully automated and at the completion of the cycle a completely prepared and cut sandwich is presented to the user. It is furthermore significant that the subject machine does not attempt to dispense any condiments in connection with the sandwich, thereby affording the user the opportunity to make any combination of selections between the food ingredients present and thereafter, selecting his own condiment which may complement the particular meats or other food ingredients selected. The subject machine also permits the operator to economize in terms of food purchases, as the food ingredients purchased for use in connection with the machine may be purchased in brick form and it is generally known that such purchases, especially in large quantities, are obtained at a lower cost per unit of meat. Hence, a very efficient as well as economical machine has been developed by virtue of the present invention. It is therefore appreciated that all of the above objects and advantages have been accomplished by means of the automatic sandwich making machine depicted herein, and the various embodiments thereof to provide an extremely efficient and economical sandwich making vending machine.

While there has been described what is at present considered to be the preferred embodiments of the invention, it will be understood that various modifications may be made therein and it is intended to cover in the appended claims all such modifications as fall within the true spirit and scope of the invention.

What is claimed is:

1. An automated sandwich preparation machine comprising in combination,
   a housing,
   sandwich ingredient selection control means mounted on said housing to permit pre-selection of food ingredients from among a variety of such ingredients,
   first bread source means mounted within said housing,
   said first bread source means including a plurality of bread chambers thereby to permit the variable selection of bread types, a series of five food ingredient source means mounted within said housing, second bread source means mounted within said housing including a plurality of bread chambers, thereby to permit variable selection of bread type conveying means mounted within said housing and positioned beneath said first bread source means, food ingredient source means, and second bread source means, each of said food ingredient source means comprising an elongated chamber mounted within said housing and positionally disposed over and above said conveying means, said chamber being dimensionally sized to retain a mass of particular food ingredients therein, and being further provided with a pivotally movable bottom cover plate at the lower end of said chamber for normally supporting and retaining said food ingredients within said chamber, said food ingredient source means being in operative interconnection with said ingredient selection control means thereby to permit variable selection of specific food ingredients among a variety of such ingredients, said first and second bread source means being operatively connected together and with said ingredient selection control means whereby the selection of a particular bread type through said ingreadient selection control means results in the coordinated movement of said first and second bread source means to dispense the identical bread type from each of said first and second bread source means, said conveying means being sequentially movable along a longitudinal path to advance sandwich ingredients from one station to the next adjacent station in response to the ingredient selection control means until a completed sandwich is prepared, said first and second bread source means comprising a series of interconnected circumferentially arranged elongated chambers, said chambers being rotationally mounted on a shaft within said housing, thereby to be rotationally movable in response to the ingredient selection control means to position a pre-determined chamber over and above said conveying means and dispense the selected bread type onto said conveying means, food slicing means positioned adjacent the lower end of each of said elongate chambers forming said food ingredient source means for slicing a pre-determined thickness of said food ingredients from the lower end of said chamber and permitting the deposition of said food ingredients onto the slice of bread after the same has been operatively moved into position thereunder by said conveying means, said slicing means being sequentially actuated by said ingredient selection control means, and said slicing means and said cover plate being sequentially connected whereby the advancement of said slicing means into slicing relation with said food ingredients causes a concomitant time displacement of said cover plate from a supporting and retaining position to an open position, said conveying means being operatively interconnected with said first bread source means, said food ingredient source means, said second bread source means and said sandwich ingredient selection control means, whereby the selection of particular food ingredients for the sandwich through said food ingredient selection control means will cause a pre-selected movement of said conveying means along a longitudinal path with intermediate stop positions beneath the appropriate bread chambers, and beneath appropriate food ingredient source means, and access means to said housing for access therein to the completed sandwich for removal from the machine.

2. The mechanism as set forth in claim 1, above, wherein said food slicing means comprises a planar member having a knife edge along its leading edge for penetrating and slicing said food ingredients, while the upper surface of said planar member provides a support surface for supporting and retaining the balance of said food ingredient within said chamber, as the knife edge advances through the food ingredient, while the sliced portion thereof is permitted to drop onto the sandwich ingredients carried by the conveying means immediately therebelow.

3. The mechanism as set forth in claim 2 above, which further includes lateral guides for guiding said planar member during the slicing stroke and cover guides for guiding the movement of said cover plate into and out of the closed position.

4. The mechanism as set forth in claim 2 above, wherein said planar member is secured to an actuating arm and said actuating arm is pivotally secured to a rotationally driven cam plate, and said cover plate is pivotally secured to the forward end of a plate arm, the opposed end of said plate arm being journalled in a slotted aperture of said cam plate in opposed relation to the pivotal mounting of said actuating arm on said cam plate, whereby the rotational movement of said cam plate sequentially advances the actuating arm and slicing edge of said planar member, and said planar member through the food ingredient while concomitantly retracting said plate arm and cover plate during the slicing operation.

5. The mechanism as set forth in claim 1 above, wherein said mechanism is further provided with a pusher arm disposed adjacent the terminal end of the path of travel of said conveying means, a retractable platform positioned adjacent said terminal end of said conveying means and movable between a cutting position and an access position, said pusher arm being movably positioned for pushing the sandwich from said conveying means to said platform, cutting means mounted within said housing in position with the cutting position of said retractable platform, and means for moving the cutting means and retractable platform relative to each other, to cuttingly halve the sandwich after which said platform moves to an access position to permit removal from said mechanism.

6. The mechanism as set forth in claim 5 above, wherein said cutting means is positionally removed from said access means whereby the danger of any accidental injury to a user is minimized.

7. The mechanism as set forth in claim 5 above, wherein said access means comprises a movable doorway mounted on said housing, adjacent said access position of said retractable platform, thereby to permit access to the sandwich from the exterior portion of said housing.

8. An automated sandwich preparation mechanism comprising in combination, a housing, sandwich ingredient selection control means mounted on said housing to permit the selection of sandwich food ingredients from among a variety of such ingredients, said ingredient selection control means comprising a plurality of electrical control elements actuated by manual switches thereby to establish the selected food ingredient deposition sequence and ultimately determining the specific sandwich food ingredient makeup, first bread source means mounted within said housing, said first bread source means including a plurality of bread chambers, thereby to permit variable selection of bread type, a plurality of food ingredient source means mounted within said housing, each of said food ingredient source means comprising an elongated chamber mounted within said housing and being dimensionally sized to retain a mass of a particular food ingredient therein and being further provided with a pivotally movable bottom cover plate at the lower end of said chamber for normally supporting and retaining said food ingredient within said chamber and food slicing means adjacent the lower end thereof for slicing a predetermined thickness of said food ingredient from the lower end of said chamber and permitting the deposition of said food ingredient onto the slice of bread after the same has been operatively moved into position thereunder, said slicing means being sequentially actuated by said ingredient selection control means and said slicing means and said cover plate being sequentially interconnected whereby the advancement of said slicing means into slicing relation with said food ingredient causes a concomitant timed displacement of said cover plate from a supporting and retaining position to an open position, second bread source means mounted within said housing and including a plurality of bread chambers thereby to permit variable selection of bread type, said first and second bread source means each comprising a series of four interconnected circumferentially arranged elongated chambers, said chambers being rotationally mounted on a shaft within said housing, thereby to be rotationally movable in response to the ingredient selection control means to position a predetermined chamber in operative position, said first and second bread source means being further operatively interconnected together and with said ingredient selection control means whereby the selection of a particular bread type through said ingredient selection control means results in the coordinated movement of said first and second bread source means to dispense the identical bread type, conveying means mounted within said housing and positioned beneath said first bread source means, said food ingredient source means, and said second bread source means, said conveying means being sequentially movable along a longitudinal path to advance the sandwich ingredients from one station to the next adjacent station in response to the ingredient selection control means, until a completed sandwich is prepared, sandwich cutting means positioned at the terminal end of said conveying means whereby the completed sandwich may be cuttingly halved, and access means provided in said housing to provide said access therethrough to the completed sandwich for removal therefrom.

9. The mechanism as set forth in claim 8 above, which further includes a retractable platform for receiving a completed sandwich thereon, following deposition of a bread slice from said second bread source means, a pusher assembly mounted adjacent said conveying means and provided with a pusher arm for pushingly removing the sandwich from said conveying means and onto said retractable platform, said retractable platform being retractable into a cutting position, and into an access position, and cutting means positioned to correspond with the cutting position of said retractable platform, whereby said retractable platform when moved into the cutting position will permit relative movement between the sandwich and said cutting means to cuttingly halve the sandwich and then be retractable into an access position to afford the user access to the completed and cut sandwich.

* * * * *